United States Patent [19]
Fields

[11] Patent Number: 5,973,037
[45] Date of Patent: Oct. 26, 1999

[54] STYRENE ETHYLENE BUTYLENE STYRENE (SEBS) COPOLYMER RUBBER MODIFIED ASPHALT MIXTURE

[76] Inventor: John R. Fields, 22626—120th East, Sumner, Wash. 98309

[21] Appl. No.: 08/978,243

[22] Filed: Nov. 25, 1997

Related U.S. Application Data

[60] Provisional application No. 60/031,966, Nov. 27, 1996.
[51] Int. Cl.[6] .................................................. C08L 95/00
[52] U.S. Cl. ............................ 524/60; 524/59; 524/62; 524/68
[58] Field of Search .................... 524/60, 62, 68, 524/59

[56] References Cited

U.S. PATENT DOCUMENTS

| | | | |
|---|---|---|---|
| 2,173,638 | 9/1939 | Rozenbroek | 554/78 |
| 2,592,564 | 4/1952 | Hardman | 106/273 |
| 3,004,056 | 10/1961 | Nunn et al. | 558/114 |
| 3,189,628 | 6/1965 | Knight et al. | |
| 3,776,985 | 12/1973 | Nehmsmann et al. | 530/232 |
| 4,173,679 | 11/1979 | Kleber et al. | 428/375 |
| 4,273,685 | 6/1981 | Marzocchi et al. | 523/150 |
| 4,368,228 | 1/1983 | Gorgati | 428/110 |
| 4,420,524 | 12/1983 | Gorgati | 428/110 |
| 4,494,992 | 1/1985 | Schreuders et al. | 106/277 |
| 4,609,697 | 9/1986 | Albers | 524/68 |
| 4,709,982 | 12/1987 | Corne et al. | 350/96.23 |
| 4,923,712 | 5/1990 | Gladfelter et al. | 427/140 |
| 4,923,913 | 5/1990 | Chich et al. | 524/62 |
| 4,966,621 | 10/1990 | Heinrich et al. | 71/86 |
| 5,019,610 | 5/1991 | Sitz et al. | 524/60 |
| 5,100,715 | 3/1992 | Zimmerman et al. | 428/147 |
| 5,169,690 | 12/1992 | Zimmerman et al. | 427/389.8 |
| 5,195,290 | 3/1993 | Hulett | 52/518 |
| 5,273,683 | 12/1993 | Krivohlavek | 252/351 |
| 5,326,797 | 7/1994 | Zimmerman et al. | 524/59 |
| 5,334,641 | 8/1994 | Rouse | 524/59 |
| 5,362,316 | 11/1994 | Paradise | 106/278 |
| 5,397,818 | 3/1995 | Flanigan | 524/68 |
| 5,436,285 | 7/1995 | Causyn et al. | 524/68 |
| 5,437,923 | 8/1995 | Vialkanoglu | 428/291 |
| 5,474,838 | 12/1995 | Callaway et al. | 428/102 |
| 5,525,653 | 6/1996 | Rouse | 524/71 |
| 5,548,027 | 8/1996 | Heucher et al. | 525/179 |
| 5,658,972 | 8/1997 | Grzybowski et al. | 524/59 |
| 5,674,313 | 10/1997 | Aoyama et al. | 106/2 |

OTHER PUBLICATIONS

Michael Russo, "Modified Asphalt: A high–end option for BUR", *Roofing, Siding and Insulation*, May 1989.

Auth. Unk., "Kraton G Polymer Modified Asphalts", Shell Chemical Company, Apr. 1989.

Auth. Unk., "Kraton G Rubber: Modifier of asphalt for built–up roofing", Shell Chemical Company, 1987.

Auth. Unk., "Kraton G Rubber: Uniquely versatile as a modifier for asphalt roofing systems", Shell Chemical Company, 1987.

Auth. Unk., "Weighing the Advantages of SEBS Modified Asphalt", *Roofing, Siding and Insulation*, Aug. 1997.

*Primary Examiner*—Peter A. Szekely
*Attorney, Agent, or Firm*—Garrison & Associates PS; Matthew J. Marquardt; David L. Garrison

[57] ABSTRACT

Process and composition for styrene-ethylene-butylene-styrene (SEBS) block copolymer modified asphalt mixtures for use in roofing, sealing, paving, and waterproofing membranes. Powdered and pelletized SEBS is added to oxidized or unoxidized asphalt flux in high-shear processes, and is applied in hot and ambient uses such as cutbacks and emulsions, with or without added fillers, fibers, or other additives.

22 Claims, 2 Drawing Sheets

STYRENE ETHYLENE BUTYLENE STYRENE (SEBS) COPOLYMER RUBBER MODIFIED ASPHALT MIXTURE

This application claims the benefit of U.S. provisional patent application Ser. No. 60/031,966, filed Nov. 27, 1996, and entitled Styrene Ethylene Butylene Styrene (SEBS) Copolymer Rubber Modified Asphalt Mixture.

TECHNICAL FIELD

The invention relates to asphalts and petroleum-based sealants and pavings; more particularly, it relates to styrene ethylene butylene styrene (SEBS) copolymer modified asphalt mixtures.

BACKGROUND OF THE INVENTION

Asphalts have been used as sealants and paving compounds for thousands of years, on roofs, roads, and in many other applications. Originally they were taken straight from bituminous deposits in the earth and applied directly. More recently they have been derived from the distillation of petroleum products, typically being defined as the end residue of the distillation process.

For many years asphalts were used in the rough forms in which they were found or distilled, without additives. As a result of efforts to address the non-uniform composition and low melting or softening points of the distillate residues used as asphalt, however, additives began to be employed. It is now typical for raw asphalt residues to be blended with various additives into relatively uniform "flux" asphalts which may either be applied directly or used as base stock for more specialized or improved asphalt forms. Most typically, however, the resultant fluxes are modified even further before use, as they typically retain unacceptably low softening points—in the range of 85–90° F. Given that surface temperatures on an asphalt roof or roadway may, under a summer sun, climb higher than 250° F., it may be seen that in many applications softening points in the region of 90° F. are unsuitable.

One of the most common means of raising the softening point of flux asphalts, and thereby increasing their utility, is the addition of oxygen to the flux. In a typical oxidation process, flux asphalt is placed in a large holding tank and heated to approximately 500° F. at atmospheric pressure, and air is introduced at the bottom of the tank and allowed to percolate up toward the top of the asphalt, creating an exothermic chemical reaction which, depending upon the amount of oxygen added, has the effect of raising the softening point of the asphalt to more than 225° F. The ASTM has published, in its D3 12-95a Standard Specification for Asphalt Used in Roofing, standards for the oxidation of asphalts, including a specification of physical properties of the asphalts following oxidation. ASTM standards from D3 12-95a are shown in Table 1. Type IV is the most highly oxidized of the ASTM asphalts, Type I the least.

TABLE 1

| Property | Type I min | Type I max | Type II min | Type II max | Type III min | Type III max | Type IV min | Type IV max |
|---|---|---|---|---|---|---|---|---|
| Softening point (° F.) | 135 | 151 | 158 | 176 | 185 | 205 | 210 | 225 |
| Flash point (° F.) | 500 | — | 500 | — | 500 | — | 500 | — |
| Penetration (units, 77° F.) | 18 | 60 | 18 | 40 | 15 | 35 | 12 | 25 |
| Ductility (cm at 77° F.) | 10.0 | — | 3.0 | — | 2.5 | — | 1.5 | — |
| Solubility in trichloro-ethylene (%) | 99 | — | 99 | — | 99 | — | 99 | — |

As shown in Table 1, however, an undesirable side effect of the oxidation process is a reduction in the ductility of the oxidized asphalt. The reduction in ductility results in a decreased resistance to thermal fatigue cycles, increased brittleness, and accelerated material breakdown. Thus further additives have been sought as a means of restoring, or even improving, flexibility and thermal resistance of oxidized asphalts. Beginning some years ago attempts were made to introduce various rubbers and rubber compounds to a wide variety of asphalt types. For example, U.S. Pat. No. 4,273,685 to Marzocchi et al. discloses a rubber modified asphalt composition prepared by reacting a bituminous material with a polymerizable aromatic monomer and a rubbery polymer whereby the rubbery polymer is chemically integrated with the asphalt. U.S. Pat. Nos. 5,334,641 and 5,525,653 to Rouse disclose process for blending finely-ground recycled waste rubber at a−50 to−80 mesh particulate size with asphalt, while acknowledging that success in mixing asphalt with rubber is dependent upon the nature of the rubber used as well as its particulate size. Causyn et al., U.S. Pat. No. 5,436,285, discloses an improved paving composition comprising graded aggregate, asphalt, SBR polymer, and recycled crumb rubber. And Aoyama et al., U. S. Pat. No. 5,674,313, discloses a cationic-rubber modified asphalt emulsion with an organic coagulating agent.

It was early found, however, that while increasing the flexibility, and therefore the durability, of asphalts exposed to repeated heat-induced expansion and contraction cycles, the addition of rubber can substantially degrade the resistance of the asphalt mix to ultraviolet (UV) rays and attack by atmospheric ozone, thus again resulting in a mix which ultimately turns brittle and loses its sealing or paving attributes. Thus there exists and has for some time existed a need for an improved rubber additive—one which is more UV and ozone resistant, strong, and impervious to water, while retaining the ability to restore flexibility and durability to an oxidized asphalt. One of the most attractive candidates as such an additive has been styrene-ethylene-butylene-styrene block copolymer (SEBS). In comparison with other rubbers, and in particular with rubbers commonly used to modify asphalts, including styrene-butadiene-styrene (SBS) rubber, SEBS has been found to have superior UV and temperature-cycle damage resistance qualities, greater thermal stability, lower permeability to moisture, and improved resistance to attack by ozone, fats, and oils. But it has also been found that the introduction of SEBS rubber to asphalt presents special difficulties. Attempts to blend SEBS with asphalt in the manner used for other rubbers showed that the SEBS would not blend properly in such processes, particularly with oxidized asphalts. In particular, it has been found that attempting to modify oxidized asphalts with SEBS rubber according to prior art methods results in virtually complete failure. It appears that this is because the oxidation process itself drives off many of the more volatile components of the asphalt flux (commonly referred to as the "light end" components of the flux), which if present would act as solvents and/or catalysts to facilitate the breakdown or dissolution of the rubber compound and its chemical bonding with the asphalt to form a homogeneous modified asphalt product. With critical amounts of the light end materials driven off, the rubber cannot dissolve and bond with the asphalt in the required proportions in conventional bonding or mixing procedures, but instead remains largely separate in a rubber-asphalt suspension having undesirable service properties for sealing and paving.

Thus there exists a need for a fast, economical, and reliable process for effectively and thoroughly mixing SEBS rubber with asphalt, and in particular with oxidized asphalt, for use in roofing, sealing, paving, waterproofing membranes and other related technologies, in order to provide a strong, flexible, water-impervious, UV and ozone-resistant, durable asphalt having a high softening or melting point.

DISCLOSURE OF THE INVENTION

Accordingly, it is an object of the invention to provide fast, economical, and reliable process for effectively and thoroughly mixing SEBS rubber with asphalt, and in particular with oxidized asphalt, for use in roofing, sealing, paving, waterproofing membranes and other related technologies.

It is a further object of the invention to provide a family of strong, flexible, water-impervious, UV and ozone-resistant, durable asphalts having high softening or melting points.

It is a further object of the invention to provide process for making an SEBS rubber modified asphalt mixture suitable for preparation with either low-shear or high-shear mixing equipment, without the addition of heat during the blending process.

It is a further object of the invention to provide SEBS rubber modified asphalt mixtures, in particular using oxidized asphalts, for a variety of roofing, sealing, and paving applications.

It is a further object of the invention to provide mineral spirit cutback SEBS rubber modified asphalt mixtures suitable for use at ambient temperatures.

It is a further object of the invention to provide SEBS rubber modified asphalt emulsions suitable for use at ambient temperatures.

It is yet another object of the invention to meet any or all of the needs summarized above.

These and such other objects of the invention as will become evident from the disclosure below are met by the invention disclosed herein.

The invention addresses and provides such a system. The invention represents process and product for styrene-ethylene-butylene-styrene (SEBS) block copolymer modified asphalt mixtures for use in roofing, sealing, paving, waterproofing membranes. Powdered and pelletized SEBS block copolymer is added to oxidized or unoxidized asphalt flux in both low-shear blenders and high-shear mixers, and combined at 250–500° F. with or without the addition of heat during the blending process; the resulting modified asphalt is applied both directly and in further-modified hot and ambient applications such as cutbacks and emulsions, with or without added fillers, fibers, or other additives.

In one aspect the invention provides method for preparing an SEBS rubber modified asphalt mixture for use in roofing, sealing, paving, waterproofing membranes and other related technologies using powdered or pelletized SEBS without plasticizers, catalysts, solvents, fillers, buffers, carriers, or other additives, by placing asphalt in a mixing vessel at 250 to 500° F., adding at least 1% by weight SEBS to the vessel; and mixing the asphalt and copolymer at 250 to 500° F. A preferred mode of practicing this aspect of the invention is to blend the mixture in a high shear mixer at a rotational rate of approximately 2,000 to approximately 4,000 RPM for about 2 to 4 hours at approximately 300 to approximately 400° F. Again, it is found that most of the advantages associated with the use of SEBS as an asphalt modifier are realized with SEBS proportions ranging from approximately 1% to approximately 25% SEBS by weight.

Another aspect of the invention is an asphalt-copolymer mixture useful in roofing, sealing, paving, waterproofing membranes and related applications, comprising at least 1% by weight of SEBS and suitable for use in "hot" applications, or those in which the asphalt is maintained at a temperature substantially above its softening point, as by addition of heat on the job site, while being used—for example, in hot mopping applications. Preferred embodiments of this aspect of the invention are oxidized and comprise from about 1% to about 25% by weight of SEBS. Other aspects of the invention include such mixtures further modified by the introduction of mineral spirits to form "cutback" compositions suitable for use at ambient temperatures (i.e. without the requirement of maintaining the composition at an elevated temperature during application) and those modified by the addition of water slurry to form emulsions also suitable for use at ambient temperatures. Cutback asphalts are preferred for use as mastics, coatings, adhesives, and cements, while emulsions are preferred for use as coatings, adhesives, waterproofings, sealings, and pavings. Preferred cutbacks are formed by the addition of 30% to 50% by weight of mineral spirits to the asphalts described; emulsions by the addition of 40% to 60% by weight water slurry to the asphalts.

BEST MODE OF CARRYING OUT THE INVENTION

Figure 2:
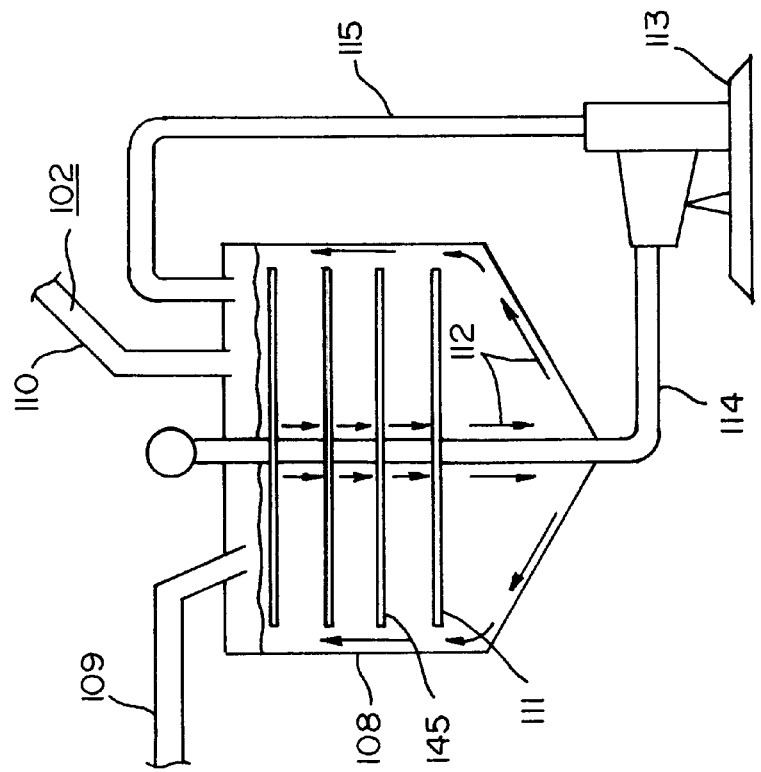
FIG. 2 is a schematic view of a preferred embodiment of an alternative preferred process for making SEBS modified asphalts according to the invention.

Preliminarily, several terms are defined as they are used in this specification.

Asphalt, for the purposes of this disclosure, means any bituminous material or hydrocarbon, with or without additives, fillers, or aggregates, having sufficient insolubility in water and viscosity to be used advantageously in roofing, sealing, paving, or waterproofing, whether naturally occurring or distilled from petroleum or like products.

SEBS, SEBS rubber, SEBS copolymer, and SEBS block copolymer means styrene-ethylene-butylene-styrene block copolymer, such as that produced and sold by the Shell Chemical Company under the tradename KRATON, and in particular that sold as KRATON G-1650, G-1652, G-1657, and G-1726. In such forms it is typically found commercially in powder or pellet form, and in some instances in plasticized compounds. Molecular weights of SEBS may vary, with center segments comprising hydrogenated polybutadiene, randomly 1,2 and 1,4, and the end segment of styrene and the ration of styrene to hydrogenated butadiene being about 3:7 by weight.

Turning now to the drawings, the invention will be described in a preferred embodiment by reference to the numerals of the drawing figures wherein like numbers indicate like parts.

Figure 1:
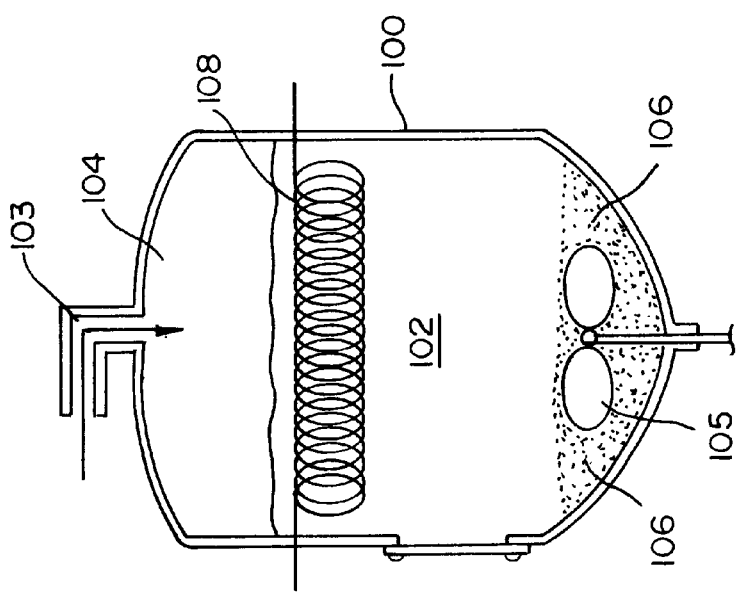
FIG. 1 is a schematic view of a preferred process for making SEBS modified asphalts according to the invention.

FIG. 1 is a schematic view of a preferred process for making SEBS modified asphalts according to the invention. SEBS copolymer 106, shown in pellet or particulate form, is disposed inside mixing vessel 100; asphalt 102, which has a temperature of between 300 and 500° F. (and preferably not above 400° F.), is introduced to the vessel through asphalt feed 103. Activation of rotor 105 at between approximately 2000 and 4000 RPM and addition of heat by means of heat exchanger 108 to maintain the temperature of the blend between 300 and 400° F. over a period of 3 to 4 hours causes combination of the asphalt and SEBS, resulting in an SEBS rubber modified asphalt mixture having a viscosity at 400° F. of about 50 to 350 centipoise and suitable for use in roofing, sealing, paving, waterproofing membranes and other related technologies. It is preferred, when practicing this aspect of the invention, to use basic, non-modified oxidized asphalts made from flux asphalts like that available from U.S. Oil and Refining Company of Tacoma, Wash., for combination with the SEBS. However, any of the asphalts as defined herein will serve.

It is immaterial to any of the processes disclosed herein whether the asphalt or the SEBS is placed in the mixing vessel first, or whether they are added simultaneously.

Preferred forms for the SEBS copolymer for practicing this aspect of the invention include powder and pellet forms such as those found in SEBS rubbers commercially available from the Shell Chemical Company under the tradenames KRATON G-1650, G-1652, G-1657, and G-1726X. However, a great variety of forms will serve, as will be appreciated by those of ordinary skill in the art of modifying asphalts by the addition of rubber, once they have been armed with this disclosure of the invention.

When practicing this aspect of the invention it has been found advantageous to maintain the asphalt and modified asphalt mixture at a temperature of about 300 to 400° F. during the mixing process. This has been found to facilitate dissolution and combination of the SEBS within the asphalt. This has been accomplished quite successfully by feeding the asphalt and the SEBS into a heated or unheated agitating tank at 300 to 500° F. and continuously running the asphalt-SEBS blend from the tank through a high hear mixer and back into the tank, as shown in FIG. 2. This results in a very satisfactory, uniform combination of the asphalt and SEBS in no more time than it takes to ensure that all of the asphalt-SEBS blend has passed through the high shear mixer once. In FIG. 2 asphalt 102 is fed to tank 108 (which may have a capacity of 30,000 gallons or more) through asphalt feed 110; powdered or pelletized SEBS is introduced to the tank via polymer feed 109 and blended with the asphalt by means of agitator 111. Agitator 111, which comprises a plurality of blades 145, prevents the SEBS from settling out of the asphalt and maintains a relatively uniform blend by continuously agitating the mix, keeping the flow moving substantially in the directions shown by arrows 112. The asphalt—SEBS blend is continuously fed through high-shear mixer 113 via feed 114 and returned to the tank after high-shear mixing via return line 115. A Siefer Trigonal wet mill or grinder model no. SM 290/HK, available from Siefer Maschinenfabrik GmbH and Co. K.G. through Siefer America Inc. and having a rated speed of 3000–4600 RPM and a flow rate of 100 gallons per minute, has been used very successfully with this aspect of the invention. A Dorr-Oliver Bitumen Homogenizer having a rated speed of 3000 RPM and a flow rate of 100 gallons per minute has also been used successfully; in particular, the Dorr-Oliver machine allows heating of the mix as it passes through the mixer, so as to maintain temperatures within the stated ranges. The function of agitator 111 may be filled very satisfactorily by, for example, using a Model 10-SV2S-4 10 h.p. Side Entry Mixer/Agitator manufactured by the Burhans-Sharpe Company of Seattle, Washington, installed in an unheated 30,000 gallon tank, operating at approximately 100–300 RPM (and preferably at about 200 RPM), although a great variety of readily-available mixers, blenders, or agitators will serve.

It is believed that one of the reasons behind the success of this aspect of the invention is that the relatively high shear rates to which the blend is subjected in the high-shear mixer, especially when taken in combination with the 300–400° F. temperatures described, causes the SEBS to break down and be dissolved in, and ultimately to bond with, the asphalt—despite, in processes using oxidized asphalts, the absence of light end products typically driven off from the asphalt during the oxidation process.

The most advantageous proportion of SEBS to be blended with an asphalt depends upon the specific application to which the asphalt is ultimately to be put. In general, it is found that adding SEBS to an asphalt mixture raises the softening point of the mixture until approximately a 20% to 25% by weight concentration of SEBS has been reached, at which point properties such as the softening point remain constant or in some cases even deteriorate slightly. Similarly, improvements in flexibility and durability tend to be maximized at about the 20% to 25% concentration (of SEBS) level. For most roofing applications it has been found that a 3% to 10% proportion by weight of SEBS copolymer in a total mixture gives best economical results in providing strong, hard but flexible, water-impervious, UV and ozone-resistant, durable asphalts with advantageous softening or melting points. Beyond a 10% concentration the benefits realized by the asphalt in hardness, strength, flexibility, water-imperviousness and UV and ozone resistance of adding SEBS tend to be offset by declining returns and increased costs (as for example for the SEBS itself), and by increased mixing times and costs. Preferred concentrations for specific applications, exclusive of any additional materials (such as solvents

TABLE 2

| Application | SEBS content, by weight (%) | Softening Point (° F.) |
| --- | --- | --- |
| Hot mopping | 8–12 | 135–225 |
| Coating for waterproofing membranes | 4–6 | 160–225 |
| Raw asphalt for mineral spirit based cutbacks | 3–5 | 115–225 |
| Raw asphalt for emulsions | 4–6 | 90–150 |
| Raw asphalt for paving and crack filling | 6–8 | 90–200 |

A principal advantage of this process aspect of the invention is its suitability for use with oxidized asphalts. As has already been discussed, oxidation is generally beneficial for raising the softening or melting point and improving the weather-resistant qualities of an asphalt, and SEBS is the best known of all additives for offsetting the brittleness and hardness, and therefore the thermal intolerance, associated with unmodified oxidized asphalts. But prior to the invention of the process disclosed herein it was impossible, as previously discussed, to satisfactorily mix oxidized asphalts with SEBS. It has been found that the modification of asphalts of all degrees of oxidation, or all ASTM Types, according to the process of this aspect of the invention, is as easy and effective as with unoxidized asphalts.

A principal advantage of the invention is that the advantages won through the modification of asphalts with SEBS rubbers extend through further modifications of modified asphalt stock to a full range of specialized asphalts, and are noted throughout the range of applications to which such specialized asphalts are typically placed. For example, SEBS modification provides the benefits noted in otherwise-conventional mineral spirit cut-back and emulsified asphalts, which are typically applied at ambient temperatures, and in each of the applications to which such asphalts are put. Asphalts of such further-modified types are modified by the addition of SEBS in the manner previously described, by means of any of the above-described processes; the advantages of SEBS modification are realized in such asphalts without need for modifying downstream processes once the basic stock asphalt has had SEBS added to it.

Figure 3:
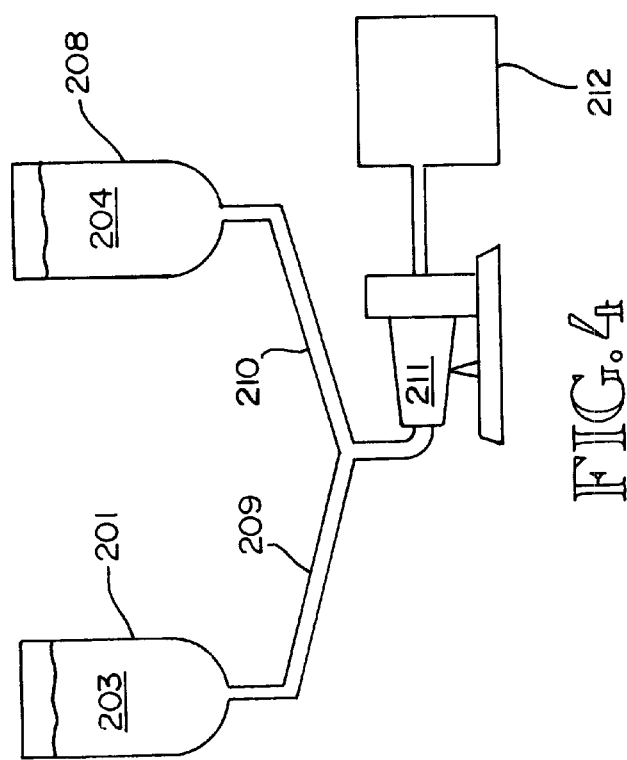
FIG. 3 is a schematic view of a preferred process for making an SEBS modified, mineral spirit cut-back asphalt according to the invention.

In the case of mineral spirit cutback asphalts, it has been found that the advantages of SEBS modification are best realized by the addition of approximately 4% to approximately 6% by weight SEBS rubber to the asphalt stock, and by the later addition of mineral spirits to comprise between approximately 30% and approximately 50% by weight of the cutback mixture. Preferred mineral spirits for use with this aspect of the invention comprise any of the common industrial grade mineral spirits, in particular those having kauri-butanol (k.b.) values of 30 or greater, and flashpoints of 100° F. or greater. In particular, the mineral spirits available commercially from the Exxon Corporation under the trade name Varsol 3139 has been found to work satisfactorily with the modified asphalts of the invention. A preferred process for producing SEBS-modified cut-back asphalts is shown in FIG. 3. SEBS-modified asphalt 203, prepared by any of the foregoing processes, is introduced to mixing tank 205 from tank 201. Mineral spirits 204, which may contain additives for a variety of reasons known in the industry, are supplied from tank 202 and placed with the asphalt in blender or mixing tank 205. In tank 205, rotor 206, which may take the form of a side-mounted mixer of the type described herein, mixes asphalt stock 203 and mineral spirits 204 to make cut-back asphalt mixture 207. In preferred processes the asphalt and mineral spirits are mixed, or blended, for a period of approximately 1 to approximately 3 hours at 100 to 300 RPM (preferably about 200 RPM) without added heat. It is noted, however, that the asphalt mixture and the cutback agents typically mix so readily that they may even just be dumped together with a bare minimum of mixing, or with no mixing at all, with satisfactory results. The modification of asphalts in the manner described (i.e. by the addition of cut-back agents) results in a softer, more pliable asphalt, suitable for use at ambient temperature for coatings, adhesives, mastics, or cements. As will appear to those of ordinary skill in the art armed with the disclosure of this invention, mixing times, rates, and temperatures may be modified to within generally-accepted, otherwise-conventional ranges for the mixing of such asphalts.

Moreover, the types of fillers typically incorporated in such special-purpose asphalts, especially in coatings, adhesives, and mastics, and which are well known to those of ordinary skill in the art of creating such asphalts, are used to good advantage with the SEBS-modified asphalts of the invention.

This process aspect of the invention has been successfully practiced using a Model 10-SV2S-4 10 h.p. Side Entry Mixer/Agitator manufactured by the Burhans-Sharpe Company of Seattle, Wash., installed in an unheated 30,000 gallon tank, at approximately 100–300 RPM (preferably at about 200 RPM) to mix the modified asphalt—mineral spirit solution over a period of approximately one to three hours to yielding approximately 30,000 gallons of SEBS modified cutback asphalt.

Figure 4:
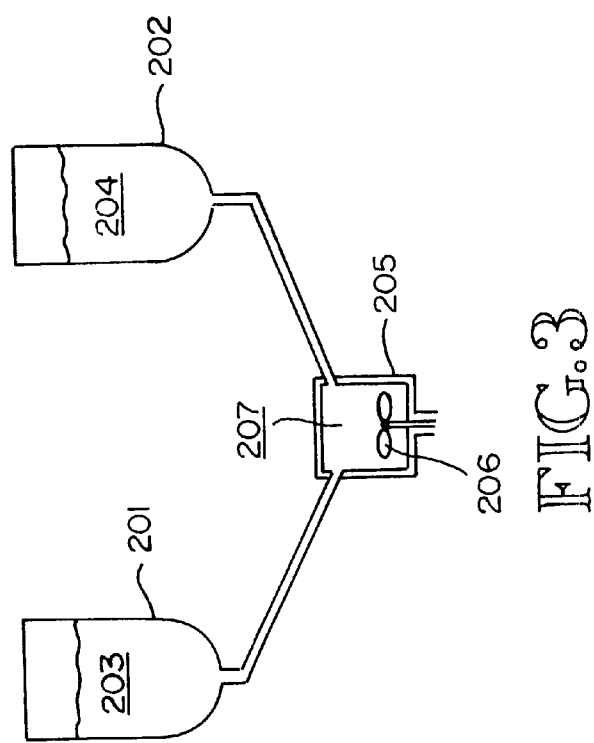
FIG. 4 is a schematic view of a preferred process for making an SEBS modified asphalt emulsion according to the invention.

In the case of emulsified asphalts, SEBS-modified base asphalts are mixed in the manner described and thereafter combined with water slurries to form emulsions by means of already well-understood processes. Such a process is illustrated in FIG. 4. SEBS-modified asphalt 203, prepared by any of the aforedescribed processes, is transferred from tank 201 to mixer or colloid mill 211 by means of feed 209, while water slurry 204 is transferred to the mixer or mill from tank 208 via feed 210. Modified asphalt 203 and slurry 204 are fed to mill 211, emulsified, and passed to storage tank 212. Preferably, the asphalt-slurry blend is milled at between approximately 150 and approximately 200° F. at approximately 3600 RPM, resulting in a smooth emulsion of micron-sized asphalt particles suspended in the slurry. While high-speed, high-shear blenders of the type described above for mixing powdered or pelletized SEBS with asphalt (e.g., the Siefer and Dorr-Oliver machines) are preferred for use in the emulsifying process, it will be apparent to those familiar with the art that a wide variety of mixing times, speeds, and conditions will serve, as is already well known. Preferred emulsions according to this aspect of the invention comprise water slurry in proportions of approximately 40% to approximately 60% by weight of the emulsion after the slurry is added. Preferred water slurries for use with this aspect of the invention comprise 85% or more water, 2–8% bentonite clay, and relatively smaller amounts of additives to encourage thickening or gelling of the emulsion, and to act as biocides. However, any slurry of the type commonly used to make emulsified asphalts will serve; the selection or identification of an appropriate slurry for use with the invention will not trouble one of ordinary skill in the art of making asphalt emulsions. Modified asphalt stocks for use in making such emulsions preferably comprise between approximately 5% and approximately 7% by weight SEBS rubber before the addition of water slurry or other additives.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability to the roofing, paving, sealing, and waterproofing fields, particularly in the asphalt industry. The invention provides greatly improved, durable, and flexible asphalts having superior resistance to degradation due to exposure to ultraviolet rays, ozone, and fatigue due to thermal expansions and contractions.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A non-plasticized cutback asphalt-copolymer mixture useful in roofing, sealing, paving, waterproofing membranes, and related applications, said mixture formed by mixing asphalt with at least 1% by weight styrene-ethylene-butylene-styrene (SEBS) copolymer and thereafter blending said asphalt-copolymer mixture with mineral spirits.

2. The mixture of claim 1, wherein the mineral spirits comprise approximately 30% to approximately 50% by weight of the mixture after the mineral spirits are added.

3. The mixture of claim 1, wherein the mixture further comprises fillers for adapting the mixture for use as a mastic, coating or adhesive.

4. The mixture of claim 1, wherein the mixture exclusive of the mineral spirits comprises approximately 4% to approximately 6% by weight styrene-ethylene-butylene-styrene (SEBS) rubber.

5. A non-plasticized asphalt-copolymer emulsion useful in roofing, sealing, paving, waterproofing membranes, said mixture formed by mixing asphalt with at least 1% by weight styrene-ethylene-butylene-styrene (SEBS) copolymer and thereafter combining said asphalt-copolymer mixture with a water slurry and blending to form an emulsion.

6. The mixture of claim 5, wherein the water slurry comprises approximately 40% to approximately 60% by weight of the emulsion after the slurry is added.

7. The mixture of claim 5, wherein the mixture exclusive of the water slurry comprises approximately 5% to approximately 7% by weight styrene-ethylene-butylene-styrene (SEBS) rubber.

8. The mixture of claim 1, wherein the asphalt is oxidized.

9. The mixture of claim 1, wherein said mineral spirits have a boiling point between about 100° F. and about 250° F.

10. The mixture of claim 5, wherein the asphalt is oxidized.

11. A method of preparing a non-plasticized mineral-spirit cutback styrene-ethylene-butylene-styrene (SEBS) modified asphalt mixture for application at ambient temperatures in roofing, sealing, paving, waterproofing membranes, the method comprising the steps of:

placing asphalt at 250 to 500 degrees F. in a mixing vessel;

adding at least 1% by weight styrene ethylene butylene styrene (SEBS) copolymer to said vessel;

mixing said asphalt and copolymer at 250 to 500 degrees F. whereby a styrene-ethylene-butylene-styrene (SEBS) modified asphaltic mixture results; and blending said asphaltic mixture with mineral spirits to form a cutback mixture suitable for application at ambient temperatures.

12. The method of claim 11, wherein said mineral spirits have a boiling point between about 100° F. and about 250° F.

13. The method of claim 11 wherein said asphalt is oxidized.

14. The method of claim 11 wherein the asphalt and copolymer are mixed at a rotational rate of approximately 2000 to approximately 4000 RPM.

15. The method of claim 11 wherein a total amount of SEBS rubber present in the asphaltic mixture comprises from about 1% to about 25% by weight of the asphaltic mixture.

16. The method of claim 11, wherein the mineral spirits comprise approximately 30% to approximately 50% by weight of the mixture after the mineral spirits are added.

17. The method of claim 11, comprising the further step of adding fillers for adapting the mixture for use as a mastic, coating, or adhesive.

18. A method of preparing a non-plasticized styrene-ethylene-butylene-styrene (SEBS) modified asphalt emulsion for application at ambient temperatures in roofing, sealing, paving, waterproofing membranes, the method comprising the steps of:

placing asphalt at 250 to 500 degrees F. in a mixing vessel;

adding at least 1% by weight styrene ethylene butylene styrene (SEBS) copolymer to said vessel;

mixing said asphalt and copolymer at 250 to 500 degrees F. whereby a styrene-ethylene-butylene-styrene (SEBS) modified asphaltic mixture results; and combining said asphaltic mixture with a water slurry to form an asphaltic emulsion suitable for application at ambient temperatures.

19. The method of claim 18, wherein said asphalt is oxidized.

20. The method of claim 18 wherein the asphalt and copolymer are mixed at a rotational rate of approximately 2000 to approximately 4000 RPM.

21. The method of claim 18 wherein a total amount of SEBS rubber present in the asphaltic mixture comprises from about 1% to about 25% by weight of the asphaltic mixture.

22. The method of claim 18, wherein the water slurry comprises approximately 40% to approximately 60% by weight of the emulsion after the slurry is added.

* * * * *